(12) United States Patent
Xu et al.

(10) Patent No.: US 8,699,543 B2
(45) Date of Patent: Apr. 15, 2014

(54) TRANSMISSION OF INFORMATION IN A WIRELESS COMMUNICATION SYSTEM

(75) Inventors: Hua Xu, Kanata (CA); Youn Hyoung Heo, Waterloo (CA); Zhijun Cai, Euless, TX (US); Mark Earnshaw, Kanata (CA); Mo-Han Fong, Ottawa (CA); Sean McBeath, Keller, TX (US); Robert Mark Harrison, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 439 days.

(21) Appl. No.: 12/860,624

(22) Filed: Aug. 20, 2010

(65) Prior Publication Data

US 2011/0064115 A1 Mar. 17, 2011

Related U.S. Application Data

(60) Provisional application No. 61/235,997, filed on Aug. 21, 2009.

(51) Int. Cl.
*H04B 1/707* (2011.01)
(52) U.S. Cl.
USPC .......................................... 375/140
(58) Field of Classification Search
USPC ................................. 375/140, 146
See application file for complete search history.

(56) References Cited

U.S. PATENT DOCUMENTS

| | | | |
|---|---|---|---|
| 7,145,959 B2 | 12/2006 | Harel et al. | |
| 7,327,801 B2 | 2/2008 | Harel et al. | |
| 2005/0201295 A1 | 9/2005 | Kim et al. | |
| 2006/0146856 A1 | 7/2006 | Jung et al. | |
| 2007/0293233 A1 | 12/2007 | Inoue et al. | |
| 2008/0045260 A1 | 2/2008 | Muharemovic et al. | |
| 2008/0254819 A1 | 10/2008 | Niwano et al. | |
| 2008/0311942 A1 | 12/2008 | Kim et al. | |

FOREIGN PATENT DOCUMENTS

WO    WO 2008/055179 A2    5/2008

OTHER PUBLICATIONS

3rd Generation Partnership Project;Technical Specification Group Radio Access Network; Evolved Universal Terrestrial Radio Access (E-UTRA);Physical Channels and Modulation (Release 8). 3GPP TS 36.211 V8.7.0 (May 2009).
3rd Generation Partnership Project; Technical Specification Group Radio Access Network (Release 8), 3GPP, 3GPP TS 36.212 ("LTE Release 8").
International Preliminary Report on Patentability issued in PCT/US2010/046213; Feb. 21, 2012; 5 pages.
International Search Report and Written Opinion for PCT Application No. PCT/US2010/046213, dated Apr. 26, 2011.

(Continued)

*Primary Examiner* — Kevin Kim
(74) *Attorney, Agent, or Firm* — Fish & Richardson P.C.

(57) ABSTRACT

Methods, devices, and systems for the transmission of information in a wireless communication system are disclosed. In one embodiment, a method for the transmission of information in a wireless communication system comprises receiving a downlink message, wherein the downlink message includes a first control channel element; determining a first index using the location of the first control channel element; determining a second index; determining a first orthogonal resource using the first index; determining a second orthogonal resource using the second index; spreading an uplink message using the first orthogonal resource to form a first spread signal; spreading the uplink message using a second orthogonal resource to form a second spread signal; transmitting the first spread signal using a first antenna; and transmitting the second spread signal using a second antenna.

26 Claims, 17 Drawing Sheets

(56) References Cited

OTHER PUBLICATIONS

R1-073462, PUCCH Allocation for ACK/NACK Transmission, 3GPP TSG RAN WG1 Meeting #50, Aug. 20-24, 2007.
R1-072097, E-UTRA Downlink CCE to RE Mapping Scheme, 3GPP TSG RAN WG1 Meeting #49, May 7-11, 2007.
International Search Report and Written Opinion for PCT Application No. PCT/US2010/055864, dated Jan. 10, 2011.
Rohde & Schwarz, "UMTS Long Term Evolution (LTE) Technology Introduction Application Note 1MA111," Sep. 2008.
3rd Generation Partnership Project; Technical Specification Group Radio Access Network; Evolved Universal Terrestrial Radio Access (E-UTRA); Physical layer procedures (Release 8) 3GPP TS 36.213 V8.7.0 (May 2009).
3rd Generation Partnership Project; Technical Specification Group Radio Access Network; Evolved Universal Terrestrial Radio Access (E-UTRA); Physical Channels and Modulation (Release 8). 3GPP TS 36.211 V8.7.0 (May 2009).
3rd Generation Partnership Project; Technical Specification Group Radio Access Network (Release 8), 3GPP, 3GPP TS 36.212 ("LTE Release 8"), Dec. 2009.
3rd Generation Partnership Project; Technical Specification Group Radio Access Network; Further Advancements for E-UTRA Physical Layer Aspects (Release 9) 3GPP TS 36.814 V9.0.0 (Mar. 2010).

PUCCH Resource Index for Downlink Semi-Persistent Scheduling

| Value of 'TPC command for PUCCH' | $n^{(1)}_{PUCCH}$ |
|---|---|
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

FIG. 16

SORTD PUCCH Resource Index for Downlink Semi-Persistent Scheduling

| Value of 'TPC command for PUCCH' | $n^{(1)}_{PUCCH}$ for first tx | $n^{(1)}_{PUCCH}$ for second tx |
|---|---|---|
| '00' | The first PUCCH resource index configured by the higher layers | The fifth PUCCH resource index configured by the higher layers |
| '01' | The second PUCCH resource index configured by the higher layers | The sixth PUCCH resource index configured by the higher layers |
| '10' | The third PUCCH resource index configured by the higher layers | The seventh PUCCH resource index configured by the higher layers |
| '11' | The fourth PUCCH resource index configured by the higher layers | The eighth PUCCH resource index configured by the higher layers |

FIG. 17

TRANSMISSION OF INFORMATION IN A WIRELESS COMMUNICATION SYSTEM

CROSS-REFERENCE TO RELATED APPLICATIONS

This application claims the benefit of U.S. Provisional Application No. 61/235,997 filed Aug. 21, 2009, entitled "TRANSMISSION OF CONTROL INFORMATION IN A WIRELESS COMMUNICATION SYSTEM." The foregoing application is incorporated herein by reference in its entirety.

FIELD

The invention generally relates to wireless communication systems and in particular to the transmission of information in a wireless communication system.

BACKGROUND

Wireless communication systems are widely deployed to provide, for example, a broad range of voice and data-related services. Typical wireless communication systems include multiple-access communication networks that allow users to share common network resources. Examples of such networks are time division multiple access ("TDMA") systems, code division multiple access ("CDMA") systems, single carrier frequency division multiple access ("SC-FDMA") systems, orthogonal frequency division multiple access ("OFDMA") systems, and other like systems. An OFDMA system is supported by various technology standards such as evolved universal terrestrial radio access ("E-UTRA"), Wi-Fi, worldwide interoperability for microwave access ("WiMAX"), ultra mobile broadband ("UMB"), and other similar systems. Further, the implementations of these systems are described by specifications developed by various industry standards bodies such as the third generation partnership project ("3GPP") and 3GPP2.

As wireless communication systems evolve, more advanced network equipment is introduced that provide improved features, functionality, and performance. A representation of such advanced network equipment may also be referred to as long-term evolution ("LTE") equipment or long-term evolution advanced ("LTE-A") equipment. LTE is the next step in the evolution of high-speed packet access ("HSPA") with higher average and peak data throughput rates, lower latency, and a better user experience especially in high-demand geographic areas. LTE accomplishes this higher performance with the use of broader spectrum bandwidth, OFDMA and SC-FDMA air interfaces, and advanced antenna methods.

Communications between wireless devices and base stations may be established using single-input, single-output systems ("SISO"), where only one antenna is used for both the receiver and transmitter; single-input, multiple-output systems ("SIMO"), where multiple antennas are used at the receiver and only one antenna is used at the transmitter; and multiple-input, multiple-output systems ("MIMO"), where multiple antennas are used at the receiver and transmitter. Compared to a SISO system, a SIMO system may provide increased coverage while a MIMO system may provide increased spectral efficiency and higher data throughput if the multiple transmit antennas, multiple receive antennas or both are utilized. Further, uplink ("UL") communication refers to communication from a wireless device to a base station. Downlink ("DL") communication refers to communication from a base station to a wireless device.

In 3rd Generation Partnership Project; Technical Specification Group Radio Access Network; Physical Channels and Modulation (Release 8), 3GPP, 3GPP TS 36.211 ("LTE Release 8"), the use of a single antenna is supported for UL transmission that employs SC-FDMA. In 3rd Generation Partnership Project; Technical Specification Group Radio Access Network; Further Advancements For E-UTRA; Physical Layer Aspects (Release 9), 3GPP, 3GPP TR 36.814 V9.0.0 (2010-03) ("LTE-A Release 10"), multiple antennas may be used to improve UL performance by, for instance, the use of transmit diversity and spatial multiplexing. Various transmit diversity schemes may be used such as space frequency block coding ("SFBC"), space time block coding ("STBC"), frequency switched transmit diversity ("FSTD"), time switched transmit diversity ("TSTD"), pre-coding vector switching ("PVS"), cyclic delay diversity ("CDD"), space code transmit diversity ("SCTD"), orthogonal resource transmission ("ORT"), and other similar approaches.

BRIEF DESCRIPTION OF THE DRAWINGS

In order for this disclosure to be understood and put into practice by one having ordinary skill in the art, reference is now made to exemplary embodiments as illustrated by reference to the accompanying figures. Like reference numbers refer to identical or functionally similar elements throughout the accompanying figures. The figures along with the detailed description are incorporated and form part of the specification and serve to further illustrate exemplary embodiments and explain various principles and advantages, in accordance with this disclosure, where:

FIG. 16 illustrates another embodiment of an orthogonal resource mapping method used to perform transmit diversity in a wireless communication system with various aspects described herein.

FIG. 17 illustrates another embodiment of an orthogonal resource mapping method used to perform transmit diversity in a wireless communication system with various aspects described herein.

Figure 1:
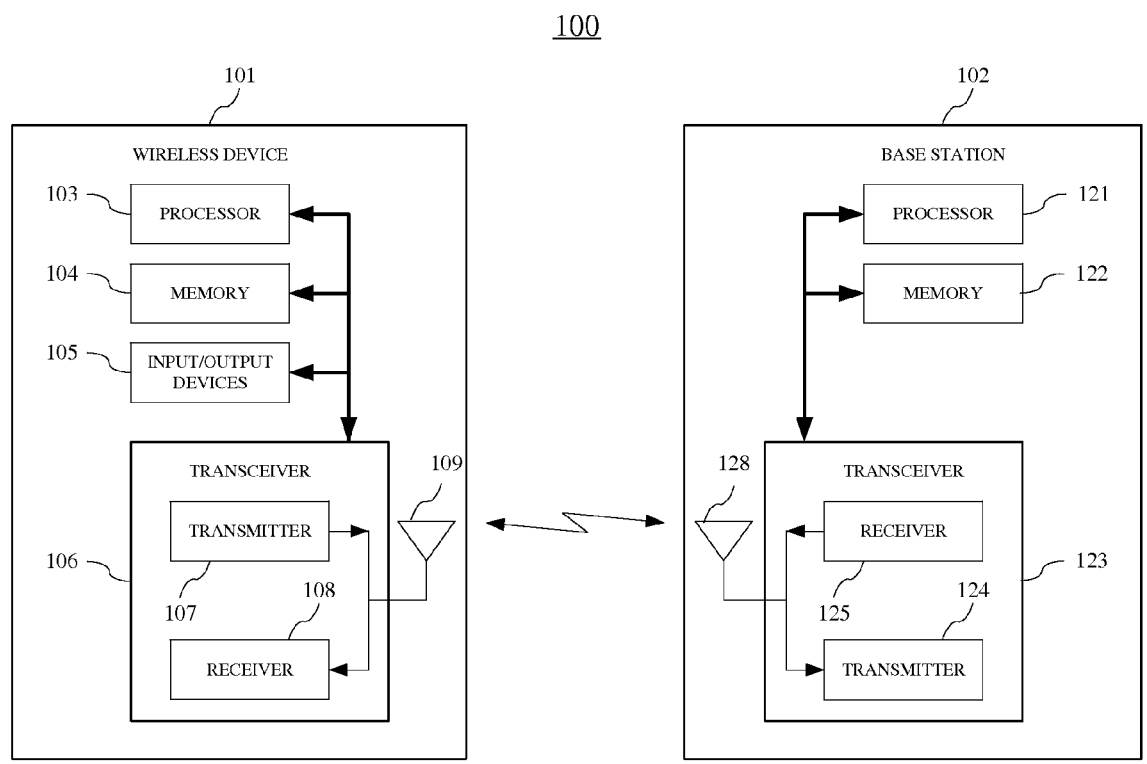
FIG. 1 illustrates an example of a wireless communication system.

Skilled artisans will appreciate that elements in the accompanying figures are illustrated for clarity, simplicity and to further improve understanding of the exemplary embodiments, and have not necessarily been drawn to scale.

DETAILED DESCRIPTION

Although the following discloses exemplary methods, devices, and systems for use in wireless communication systems, it will be understood by one of ordinary skill in the art that the teachings of this disclosure are in no way limited to the exemplary embodiments shown. On the contrary, it is contemplated that the teachings of this disclosure may be implemented in alternative configurations and environments. For example, although the exemplary methods, devices, and systems described herein are described in conjunction with a configuration for E-UTRA systems, which is the air interface of the 3GPP organization's LTE upgrade path for mobile networks, those of ordinary skill in the art will readily recognize that the exemplary methods, devices, and systems may be used in other wireless communication systems and may be configured to correspond to such other systems as needed. Accordingly, while the following describes exemplary methods, devices, and systems of use thereof, persons of ordinary skill in the art will appreciate that the disclosed exemplary embodiments are not the only way to implement such methods, devices, and systems, and the drawings and descriptions should be regarded as illustrative in nature and not restrictive.

Various techniques described herein can be used for various wireless communications systems. The various aspects described herein are presented as systems that can include a number of components, devices, elements, members, modules, peripherals, or the like. Further, these systems can include or not include additional components, devices, elements, members, modules, peripherals, or the like. In addition, various aspects described herein can be implemented in hardware, firmware, software or any combination thereof. It is important to note that the terms "network" and "system" can be used interchangeably. Relational terms described herein such as "above" and "below," "left" and "right," "first" and "second," and the like may be used solely to distinguish one entity or action from another entity or action without necessarily requiring or implying any actual such relationship or order between such entities or actions. The term "or" is intended to mean an inclusive "or" rather than an exclusive "or." Further, the terms "a" and "an" are intended to mean one or more unless specified otherwise or clear from the context to be directed to a singular form.

Wireless communication networks consist of a plurality of wireless devices and a plurality of base stations. A base station may also be called a node-B ("NodeB"), a base transceiver station ("BTS"), an access point ("AP"), or some other equivalent terminology. A base station typically contains one or more radio frequency ("RF") transmitters and receivers to communicate with wireless devices. Further, a base station is typically fixed and stationary. For LTE and LTE-A equipment, the base station is also referred to as an E-UTRAN NodeB ("eNB").

A wireless device used in a wireless communication system may also be referred to as a mobile station ("MS"), a terminal, a cellular phone, a cellular handset, a personal digital assistant ("PDA"), a smartphone, a handheld computer, a desktop computer, a laptop computer, a tablet computer, a set-top box, a television, a wireless appliance, or some other equivalent terminology. A wireless device may contain one or more RF transmitters and receivers, and one or more antennas to communicate with a base station. Further, a wireless device may be fixed or mobile and may have the ability to move through a wireless communication system. For LTE and LTE-A equipment, the wireless device is also referred to as user equipment ("UE").

FIG. 1 is a block diagram of a system 100 for wireless communication. In FIG. 1, system 100 can include one or more wireless devices 101 communicatively linked with one or more base stations 102. Wireless device 101 can include a processor 103 coupled to a memory 104, an input/output device 105, a transceiver 106, or any combination thereof, which can be utilized by wireless device 101 to implement various aspects described herein. Transceiver 106 of wireless device 101 can include one or more transmitters 107 and one or more receivers 108. Further, associated with wireless device 101, one or more transmitters 107 and one or more receivers 108 can be connected to one or more antennas 109.

Similarly, base station 102 can include a processor 121 coupled to a memory 122, and a transceiver 123, which can be utilized by base station 102 to implement various aspects described herein. Transceiver 123 of base station 102 can include one or more transmitters 124 and one or more receivers 125. Further, associated with base station 102, one or more transmitters 124 and one or more receivers 125 can be connected to one or more antennas 128.

Base station 102 can communicate with wireless device 101 on the UL using one or more antennas 109 and 128, and on the DL using one or more antennas 109 and 128, associated with wireless device 101 and base station 102, respectively. Base station 102 can originate DL information using one or more transmitters 124 and one or more antennas 128, where it can be received by one or more receivers 108 at wireless device 101 using one or more antennas 109. Such information can be related to one or more communication links between base station 102 and wireless device 101. Once information is received by wireless device 101 on the DL, wireless device 101 can process the received information to generate a response relating to the received information. Such response can be transmitted back from wireless device 101 on the UL using one or more transmitters 107 and one or more antennas 109, and received at base station 102 using one or more antennas 128 and one or more receivers 125.

Figure 2:
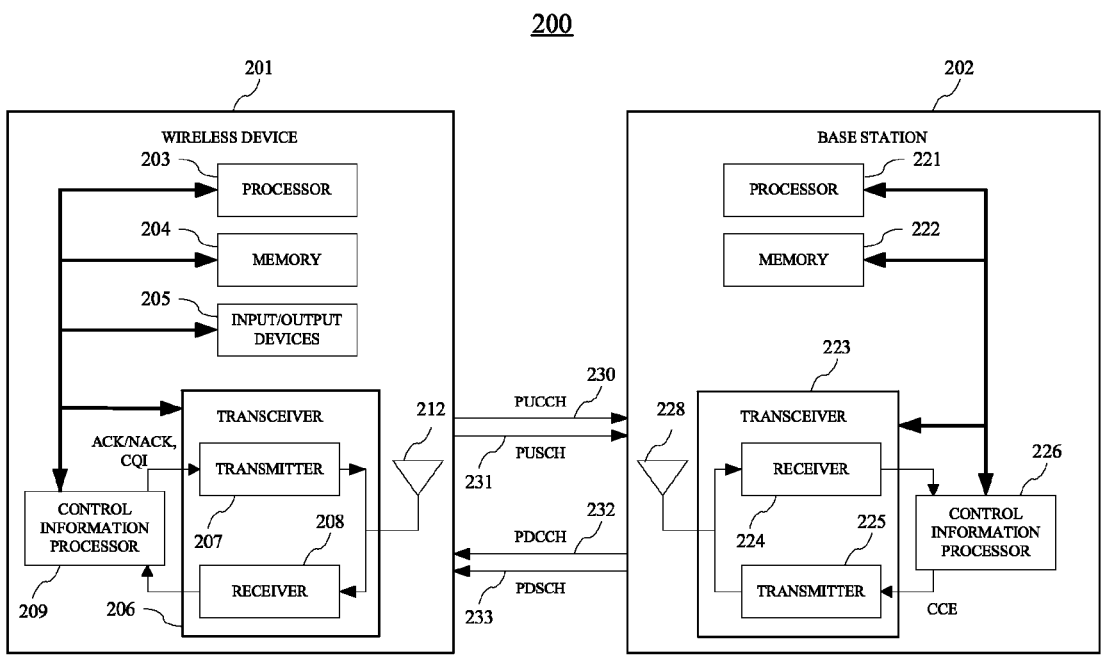
FIG. 2 is a block diagram of one embodiment of a wireless communication system using a control channel structure in accordance with various aspects set forth herein.

In accordance with one aspect, the wireless communication of control information can be conducted using a wireless communication system such as a system 200 as illustrated in FIG. 2. In one embodiment, system 200 illustrates a control signaling structure that can be employed in a system using LTE or LTE-A equipment or another appropriate wireless communication technology. System 200 can include a wireless device 201 communicatively linked with a base station 202. Wireless device 201 can include a processor 203 coupled to a memory 204, an input/output device 205, a transceiver 206, and a control information processor 209. Transceiver 206 of wireless device 201 can include one or more transmitters 207 and one or more receivers 208. Transmitter 207 and receiver 208 both of wireless device 201 can be coupled to antenna 212. Base station 202 can include a processor 221 coupled to a memory 222, a transceiver 223, and a control information processor 226. Transceiver 223 of base station 202 can include one or more receivers 224 and one or more transmitters 225. Transmitter 225 and receiver 224 both of base station 202 can be coupled to antenna 228.

As shown in FIG. 2, UL control signaling can be carried on, for instance, a physical uplink control channel ("PUCCH") 230 or a physical uplink shared channel ("PUSCH") 231. UL data can be carried on, for instance, a PUSCH 231. DL control signaling can be carried on, for instance, a physical downlink control channel ("PDCCH") 232, and DL data can be carried on, for instance, a physical downlink shared channel ("PDSCH") 233.

In one embodiment, control information processor 226 of base station 202 can generate or otherwise obtain data, control information, or other information intended for wireless device 201. The control information can then be originated on PDCCH 232 and data can be transmitted on PDSCH using transmitter 225 and antenna 228 of base station 202, where antenna 212 and receiver 208 at wireless device 201 can receive it. Once information is received by wireless device 201 on the DL, control information processor 209 of wireless device 201 can process the received information to generate a response relating to the received information.

Such response can then be transmitted back to base station 202 on PUCCH 230, or on PUSCH 231 when, for instance, the PUSCH resource is allocated. Such response can be transmitted using transmitter 207 and antenna 212 of wireless device 201 and received at base station 202 using receiver 224 and antenna 228. Once information is received by base station 202 on the UL, control information processor 226 of base station 202 can process the received information to generate a response relating to the received information, and facilitate transmission of any generated control information on the DL to wireless device 201.

In another embodiment, control information processor 209 of wireless device 201 can generate UL control information, including an acknowledgement ("ACK") for correctly received data, a negative acknowledgement ("NAK") for incorrectly received data or both; channel quality information ("CQI"), such as channel quality indications, precoding matrix index ("PMI"), or rank indicator ("RI"); or any other information. ACK/NAK can be transmitted using PUCCH format 1a/1b, and CQI can be transmitted using PUCCH format 2/2a/2b. PUCCH format 1 can be used by wireless device 201 for a scheduling request. PUCCH format 1/1a/1b can share the same structure as persistent and dynamic ACK/NAK. PUCCH format 2/2a/2b can be used for CQI and concurrent transmission of CQI and ACK/NAK.

Figure 3:
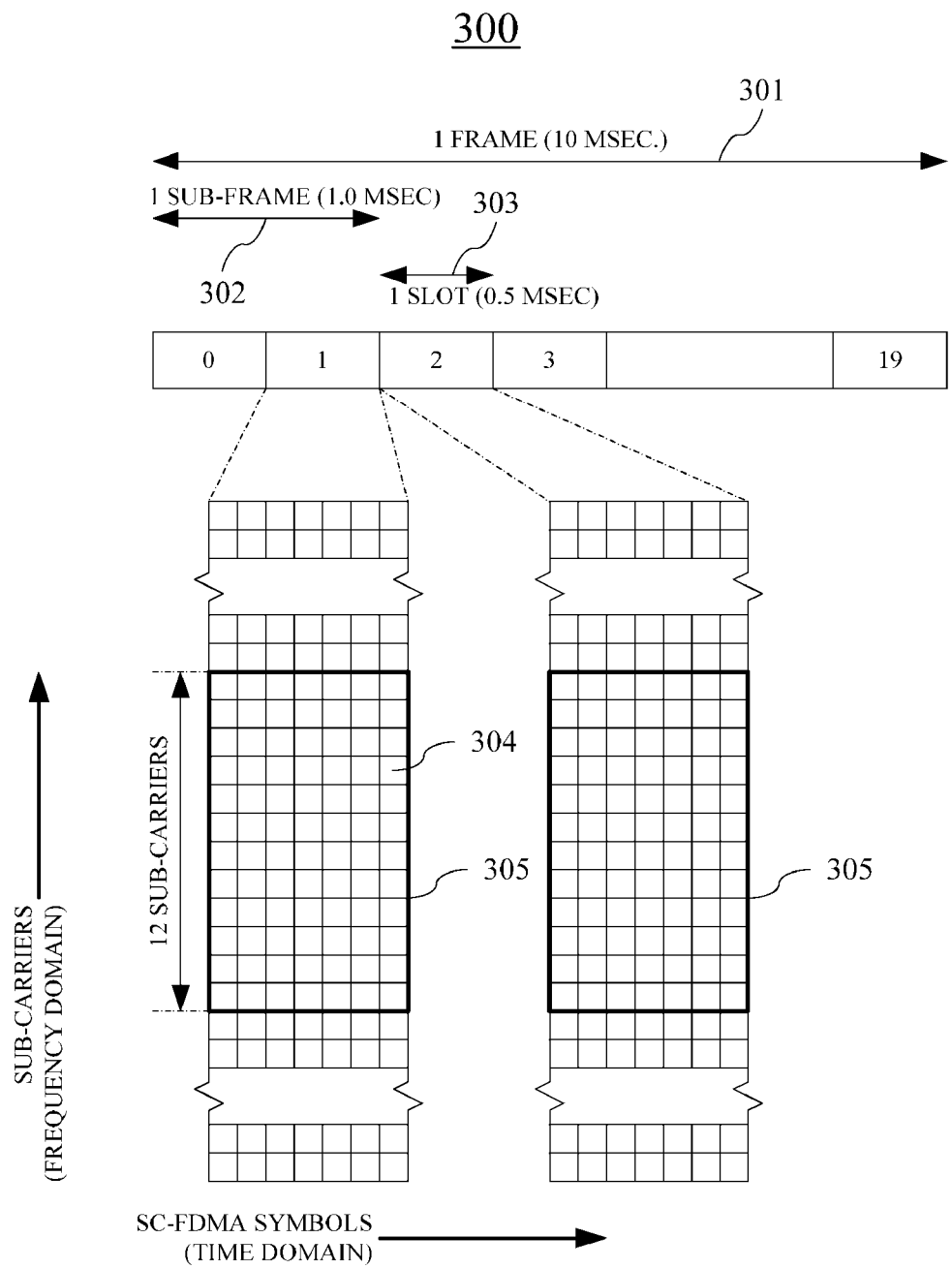
FIG. 3 illustrates an exemplary uplink channel structure that can be employed in a wireless communication system.

The communication of control information in a wireless communication system can use an exemplary structure 300 as illustrated in FIG. 3. In FIG. 3, structure 300 illustrates an UL control channel structure that can be employed in a system using LTE or LTE-A equipment or another appropriate wireless communication technology. In structure 300, one frame 301 can include twenty slots 303 of 0.5 msec duration each, and one sub-frame 302 can include two slots 303. Each slot 303 can carry six or seven SC-FDMA symbols in the time domain, depending on the type of cyclic prefix used, and may include twelve sub-carriers in the frequency domain in each resource block ("RB"). In the exemplary, normal cyclic prefix is used, and as such, seven SC-FDMA symbols can be transmitted in each RB. It is important to recognize that the claimed subject matter is not limited to this particular channel structure.

Referring to FIG. 3, an exemplary of several RBs 305 is shown. As a person of ordinary skill in the art would appreciate, RB 305 is a time-frequency allocation that is assigned to a wireless device and can be defined as the smallest unit of resource allocation by the base station. Further, RB 305 may extend across a plurality of slots 303. The LTE UL may allow for a very high degree of flexibility allowing for any number of uplink RBs 305 ranging, for instance, from a minimum of six RBs 305 to a maximum of one hundred RBs 305. RB 305 can be comprised of a plurality of resource elements ("RE") 304, which can represent a single sub-carrier in frequency for a time period of one symbol.

Figure 4:
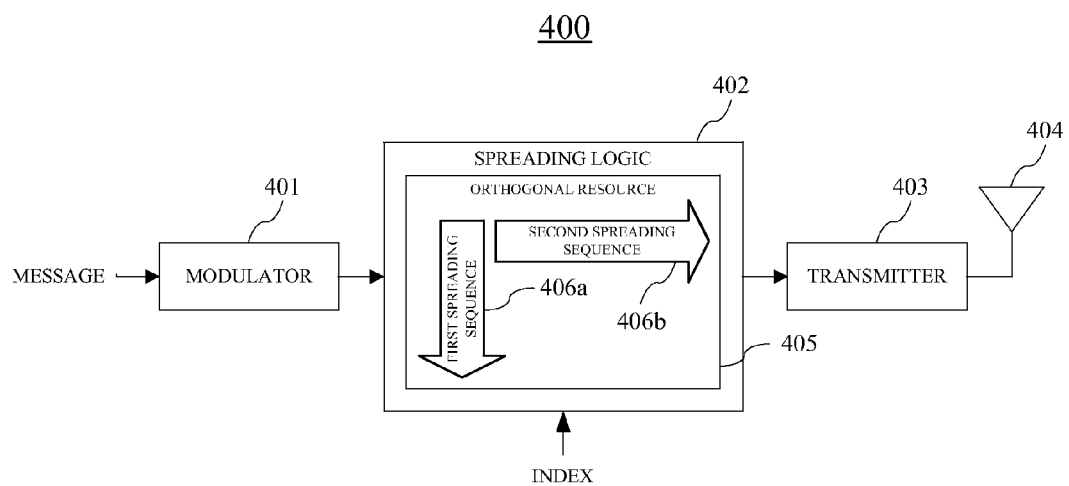
FIG. 4 is a block diagram of an exemplary system that facilitates the transmission of information.

FIG. 4 is a block diagram of an exemplary system 400 that facilitates transmission of control information in a wireless communication system. In system 400, a message can be input to a modulator 401. Modulator 401, for instance, may apply quadrature phase shift keying ("QPSK") modulation, binary phase shift keying ("BPSK"), or any other form of modulation. The modulated symbols are then input to a spreading logic 402. An index is also input to spreading logic 402 and used to select an orthogonal resource 405, which is composed of a first spreading sequence 406a and a second spreading sequence 406b. Spreading logic 402 applies first spreading sequence 406a and second spreading sequence 406b to the modulated symbols. Such two one-dimensional ("1-D") spreading sequences could also be calculated or generated and stored in temporary or permanent memory as two-dimensional ("2-D") spreading sequences, each corresponding to an index. Such 2-D spreading sequences could be applied to modulated symbols to perform the spreading operation. In one example, one of the spreading sequences can be a Zadoff-Chu sequence while the other spreading sequence can be an orthogonal cover sequence. The modulated symbols after spreading are input to a transmitter 403 for transmission using an antenna 404 to, for instance, a base station.

Figure 5:
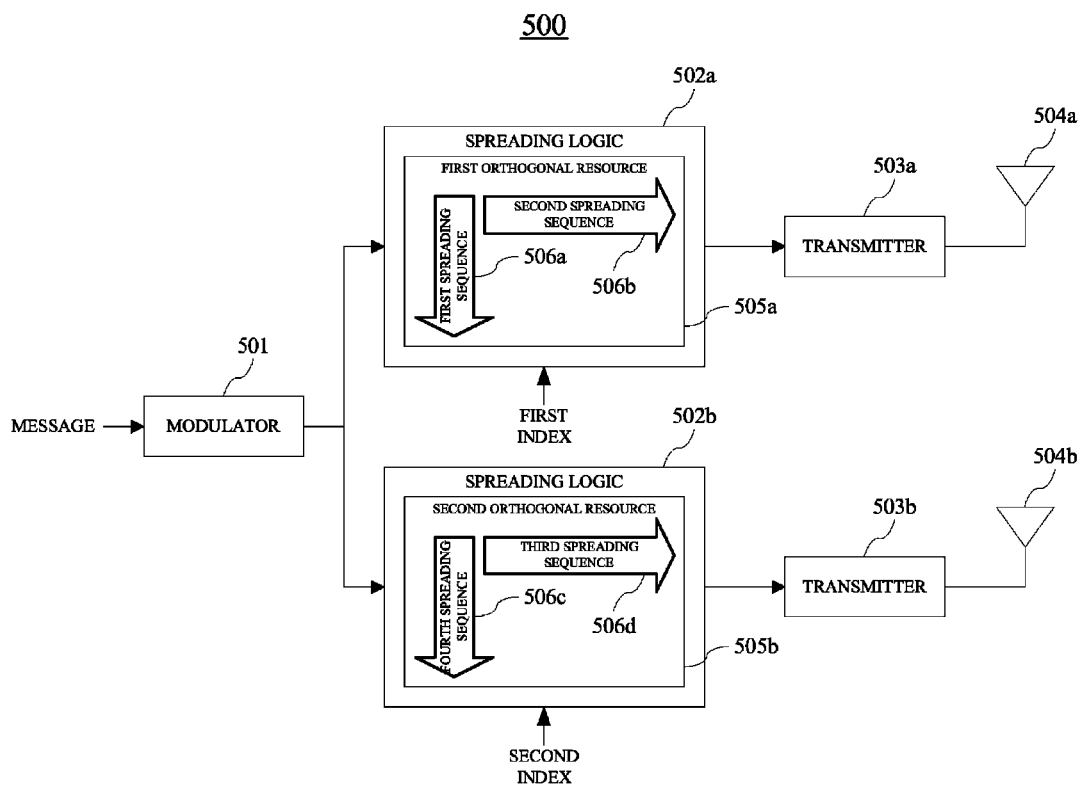
FIG. 5 is a block diagram of an exemplary system that facilitates the transmission of information using transmit diversity.

Spatial orthogonal transmit diversity ("SORTD"), which may also be referred to as space coding transmit diversity ("SCTD"), and whose general principles are described in 3GPP document R1-091925, *Evaluation of transmit diversity for PUCCH in LTE-A*, Nortel, 3GPP TSG-RAN WG1 #57, San Francisco, US, May 4-8, 2009, may be applied to modulated messages for improved communication performance while maintaining low peak to average power ratio ("PAPR") when the transmit diversity system uses multiple antennas. One of ordinary skill in the art will appreciate the need to maintain a low PAPR of a SC-FDMA transmission. The wireless transmission of information can be conducted using a transmit diversity scheme such as an exemplary system 500 as illustrated in FIG. 5. In FIG. 5, system 500 describes a SORTD scheme that can be employed in a wireless communication system.

Referring to FIG. 5, a message is input to a modulator 501. Modulator 501, for instance, may apply quadrature phase shift keying ("QPSK") modulation, binary phase shift keying ("BPSK"), or any other form of modulation. The modulated symbols can be input to spreading logic 502a and 502b. Each modulated symbol can be spread in both of spreading logic 502a and 502b. A first index and a second index can be input to spreading logic 502a and 502b for selection of orthogonal resources 505a and 505b, respectively. First orthogonal resource 505a is composed of first spreading sequence 506a and second spreading sequence 506b, or a pre-calculated or a concurrently-generated combined spreading sequence comprising first spreading sequence 506a combined with second spreading sequence 506b. Second orthogonal resource 505b is composed of third spreading sequence 506c and fourth spreading sequence 506d, or a pre-calculated or concurrently-generated combined spreading sequence comprising third spreading sequence 506c combined with fourth spreading sequence 506d.

In FIG. 5, spreading logic 502a can apply first spreading sequence 506a and second spreading sequence 506b to the modulated symbols, or can apply the pre-calculated or concurrently-generated combined spreading sequence including first spreading sequence 506a combined with second spreading sequence 506b. In parallel, spreading logic 502b can apply third spreading sequence 506c and fourth spreading sequence 506d to the modulated symbols, or can apply the pre-calculated or concurrently-generated combined spreading sequence comprising third spreading sequence 506c combined with fourth spreading sequence 506d. The modulated symbols after spreading can be input to transmitters 503a and 503b and transmitted via antennas 504a and 504b, respectively. The signals transmitted from antennas 504a and 504b can superpose each other in the air. A base station can receive the transmitted message using an antenna and a receiver. Since the base station can know a priori the orthogonal resources 505a and 505b applied to the modulated message transmitted from each antenna 504a and 504b, the base station can separate each modulated message by using the same orthogonal resources 505a and 505b.

A PDCCH can be transmitted on an aggregation of one or more CCEs. CCEs, when used as control channel elements, are the minimum unit for carrying a downlink message such as a PDCCH. A PDCCH can be assigned using one or more CCEs in order to provide the PDCCH with a code rate corresponding to the quality of the wireless communication between a base station and a wireless device. The format of the PDCCH can be determined according to, for instance, the payload size of the control information, the code rate, and the assigned number of CCEs. A plurality of PDCCHs may be transmitted in a single subframe in a specific control region, which normally occupies the first one or several OFDM symbols. A wireless device can monitor the control region of every subframe and can attempt to find its corresponding PDCCH by, for instance, blind decoding over CCEs in designated or predetermined search spaces. In LTE Release 8, the index of an orthogonal resource for spreading an uplink ACK/NAK message can be derived from the first CCE in the PDCCH in which the corresponding PDSCH is scheduled. Such index can be derived using, for instance, the location of the corresponding CCE.

Figure 6:
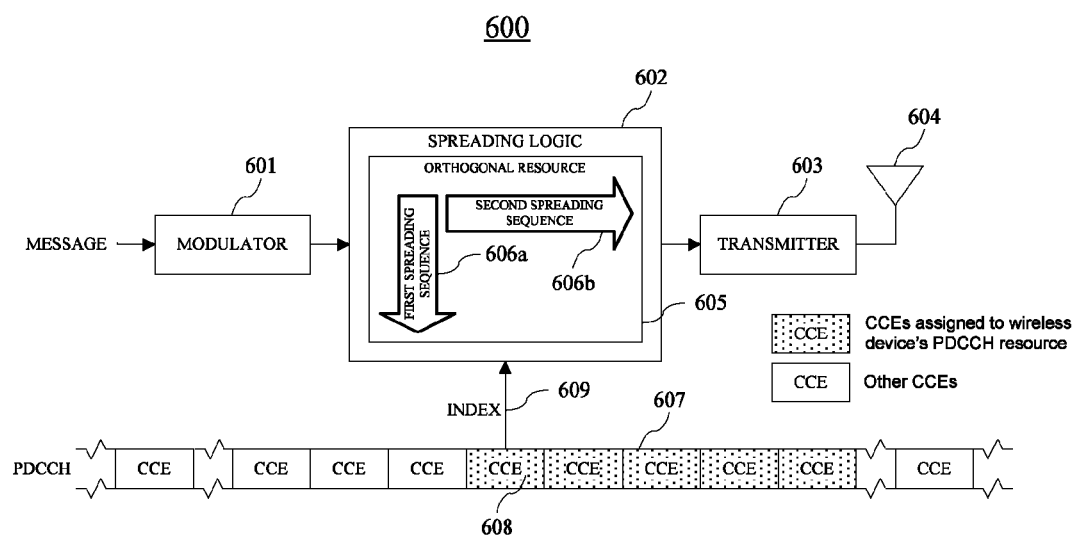
FIG. 6 is a block diagram of another exemplary system that facilitates the transmission of information.

The wireless transmission of control information can be conducted using a transmit diversity scheme such as an exemplary system 600 as illustrated in FIG. 6. In FIG. 6, system 600 illustrates a SORTD scheme that can be employed in a wireless communication system using LTE or LTE-A equipment or another appropriate wireless communication technology.

Referring to FIG. 6, a wireless device can transmit a message on the UL such as an ACK/NAK on a PUCCH format 1a/1b message. It is important to recognize that different UL physical channels, such as PUCCH with formats 1/1a/1b, PUCCH with formats 2/2a/2b and PUSCH, use different modulation techniques that may require each UL physical channel transmission to use a different transmit diversity scheme to achieve improved performance. In FIG. 6, a message such as ACK/NAK can be input to a modulator 601. Modulator 601, for instance, may apply quadrature phase shift keying ("QPSK") modulation, binary phase shift keying ("BPSK"), or any other form of modulation. The modulated symbols can be input to a spreading logic 602. An index 609 for selecting an orthogonal resource 605 for spreading a message can be derived using the index of the first CCE 608 of the PDCCH 607 in which the corresponding PDSCH is scheduled. Index 609 can be input to spreading logic 602 and can be used to select orthogonal resource 605, which can be composed of a first spreading sequence 606a and a second spreading sequence 606b. Spreading logic 602 can apply first spreading sequence 606a and second spreading sequence 606b to the modulated symbols. The modulated symbols after spreading can be input to a transmitter 603. Transmitter 603 can place modulated symbols after spreading into an RB for transmission using an antenna 604 to a base station. In one example, a PUCCH format 1 message used for a scheduling request may bypass modulator 601, be input to spreading logic 602, and input to transmitter 603 for UL transmission using antenna 604.

Figure 7:
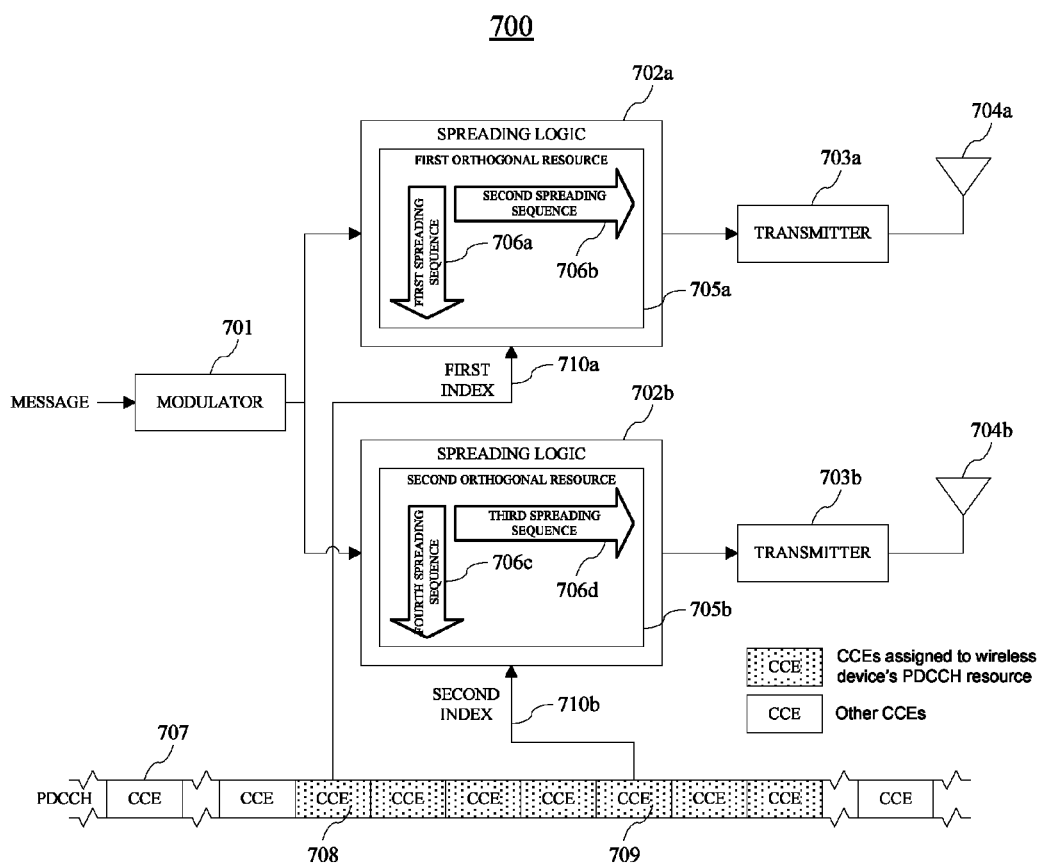
FIG. 7 is a block diagram of one embodiment of a wireless transmission system using a transmit diversity scheme with various aspects described herein.

LTE-A Release 10 may support multiple transmit antennas on the UL. To support transmit diversity such as SORTD for LTE-A equipment can require multiple orthogonal resources. In accordance with one aspect, the wireless transmission of control information can be conducted using a transmit diversity scheme such as a system 700 as illustrated in FIG. 7. In this embodiment, system 700 illustrates a SORTD scheme that can be employed in a system using LTE or LTE-A equipment or another appropriate wireless communication technology. SORTD may be applied, for instance, to a modulated PUCCH format 1/1a/1b message for improved communication performance while maintaining low PAPR. In system 700, orthogonal resource spreading over each transmit antenna is achieved by mapping indices of those of CCEs in a PDCCH to the orthogonal resources used for PUCCH ACK/NAK transmission.

Referring to FIG. 7, a message such as a PUCCH format 1/1a/1b message can be input to a modulator 701. Modulator 701, for instance, may apply quadrature phase shift keying ("QPSK") modulation, binary phase shift keying ("BPSK"), or any other form of modulation. The modulated symbols can be input to a spreading logic 702a and 702b. A first index 710a for selecting an orthogonal resource 705a for spreading a message can be derived using the index of a first CCE 708 of a PDCCH 707 in which the corresponding PDSCH is scheduled. A second index 710b for selecting an orthogonal resource 705b for spreading a message can be derived by selecting and using the index of a second CCE 709 of PDCCH 707. First index 710a and second index 710b can be input to spreading logic 702a and 702b for selection of a first orthogonal resource 705a and a second orthogonal resource 705b, respectively. First orthogonal resource 705a can be composed of a first spreading sequence 706a and a second spreading sequence 706b, or a first pre-calculated or concurrently generated combined sequence comprising first spreading sequence 706a and second spreading sequence 706b. Second orthogonal resource 705b can be composed of a third spreading sequence 706c and a fourth spreading sequence 706d, or a second pre-calculated or concurrently generated combined sequence comprising third spreading sequence 706c and fourth spreading sequence 706d. Spreading logic 702a can apply first spreading sequence 706a and second spreading sequence 706b to the modulated symbols, or can apply the first pre-calculated or concurrently generated combined sequence comprising first spreading sequence 706a and second spreading sequence 706b. In parallel, spreading logic 702b can apply third spreading sequence 706c and fourth spreading sequence 706d to the modulated symbols, or can apply the second pre-calculated or concurrently generated combined sequence comprising third spreading sequence 706c and fourth spreading sequence 706d. The modulated symbols after spreading can be input to transmitters 703a and 703b and transmitted using antennas 704a and 704b, respectively.

Figure 8:
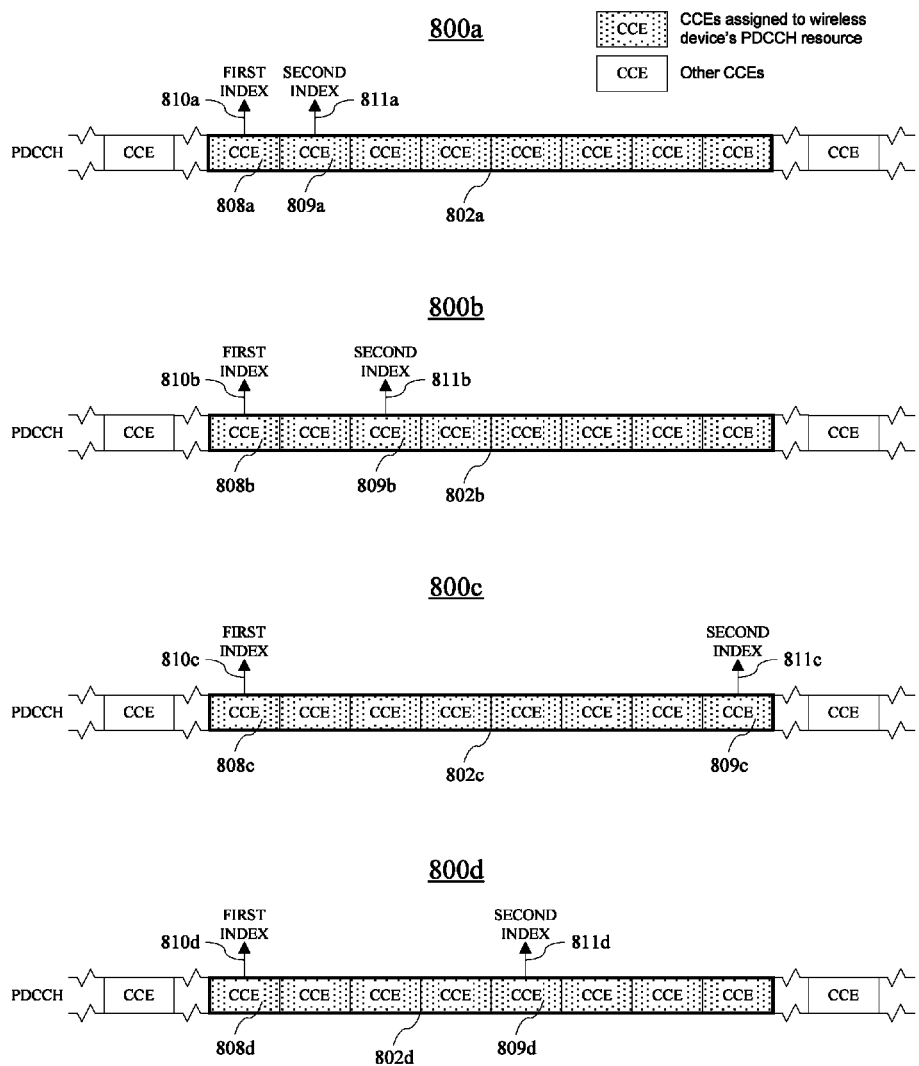
FIG. 8 illustrates multiple embodiments of an orthogonal resource mapping method used to perform transmit diversity in a wireless communication system with various aspects described herein.

When there is a plurality of CCEs in PDCCH and there are more CCEs than the number of orthogonal resources required, then the index of each CCE can be used as an index to an orthogonal resource used for spreading the PUCCH ACK/NAK. In accordance with one aspect, the mapping of orthogonal resources for transmit diversity in a wireless communication system can be conducted using various mapping methods such as methods 800a, 800b, 800c and 800d as illustrated in FIG. 8. In these embodiments, methods 800a, 800b, 800c and 800d illustrate the mapping of indices of selected CCEs to orthogonal resources that can be employed in a system using LTE or LTE-A equipment or another appropriate wireless communication technology. Methods 800a, 800b, 800c, 800d or the like, if known a priori by both a wireless device and a base station may not require further communication between the wireless device and the base station to implement such methods. Alternatively, the wireless device and the base station may exchange communication to select one or more mapping methods such as methods 800a, 800b, 800c, 800d, or the like.

Referring to FIG. 8, method 800a shows a plurality of CCEs on a PDCCH. A base station can assign PDCCH resource 802a to a wireless device. PDCCH resource 802a can include a plurality of CCEs. The wireless device can determine the location of a first CCE 808a of PDCCH resource 802a. The location of first CCE 808a can be one of a plurality of CCEs contained in PDCCH resource 802a. The wireless device may use, for instance, blind detection to determine the location of first CCE 808a. A second CCE 809a can be selected as the CCE adjacent and consecutive to first CCE 808a logically. A first index 810a and a second index 811a can be derived from indices of first CCE 808a and second CCE 809a and can be used to select a first orthogonal resource 705a of a spreading logic 702a and a second orthogonal resource 705b of a spreading logic 702b for use in orthogonal spreading of a message, respectively.

Referring to FIG. 8, method 800b shows a plurality of CCEs on a PDCCH. A base station can assign a PDCCH resource 802b to a wireless device. PDCCH resource 802b can include a plurality of CCEs. The wireless device can determine the location of a first CCE 808b of PDCCH resource 802b. The location of first CCE 808b can be one of a plurality of CCEs contained in PDCCH resource 802b. The wireless device may use, for instance, blind detection to determine the location of first CCE 808b. A second CCE 809b can be selected as a fixed span of CCEs from first CCE 808b. For example, method 800b shows second CCE 809b as a fixed span of two CCEs from first CCE 808b. A first index 810b and a second index 811b can be derived from indices of first CCE 808b and second CCE 809b and can be used to select a first orthogonal resource 705a of a spreading logic 702a and a second orthogonal resource 705b of a spreading logic 702b for use in orthogonally spreading a message, respectively.

Referring to FIG. 8, method 800c shows a plurality of CCEs on a PDCCH. A base station can assign a PDCCH resource 802c to a wireless device. PDCCH resource 802c can include a plurality of CCEs. The wireless device can determine the location of a first CCE 808c of PDCCH resource 802c. The location of first CCE 808c can be one of a plurality of CCEs contained in PDCCH resource 802c. The wireless device may use, for instance, blind detection to determine the location of first CCE 808c. A second CCE 809c can be selected as the last CCE in PDCCH resource 802c relative to first CCE 808c. For example, method 800c shows first CCE 808c as the first CCE of PDCCH resource 802c and second CCE 809c as the last CCE of PDCCH resource 802c. A first index 810c and a second index 811c can be derived from indices of first CCE 808c and second CCE 809c, and used to select a first orthogonal resource 705a of a spreading logic 702a and a second orthogonal resource 705b of a spreading logic 702b for use in orthogonal spreading of a message, respectively.

Referring to FIG. 8, method 800d shows a plurality of CCEs on a PDCCH. A base station can assign a PDCCH resource 802d to a wireless device. PDCCH resource 802d can include a plurality of CCEs. The wireless device can determine the location of a first CCE 808d of PDCCH resource 802d. The location of first CCE 808d can be one of a plurality of CCEs contained in PDCCH resource 802d. The wireless device may use, for instance, blind detection to determine the location of first CCE 808d. The selection of a second CCE 809d is constrained by and must satisfy $$m \bmod \left( \left\lfloor \frac{M}{N} \right\rfloor \right) = 0,$$

where m is the index of second or successive CCEs 809d, M is the number of CCEs in PDCCH resource 802d, and N is the number of orthogonal resources required. In one embodiment, the number of orthogonal resources required corresponds to the number of antennas of a wireless device. For m=0, the index corresponds either to a specific CCE in the overall PDCCH search space or to the first CCE of the PDCCH being considered. For example, for M=8 and N=2, second CCE 809d would be selected as m=4, the fourth CCE of PDCCH resource 802d relative to first CCE 808d of PDCCH resource 802d. A first index 810d and a second index 811d can be derived from indices of first CCE 808d and second CCE 809d and used to select a first orthogonal resource 705a of a spreading logic 702a and a second orthogonal resource 705b of a spreading logic 702b for use in orthogonal spreading of a message, respectively.

Figure 9:
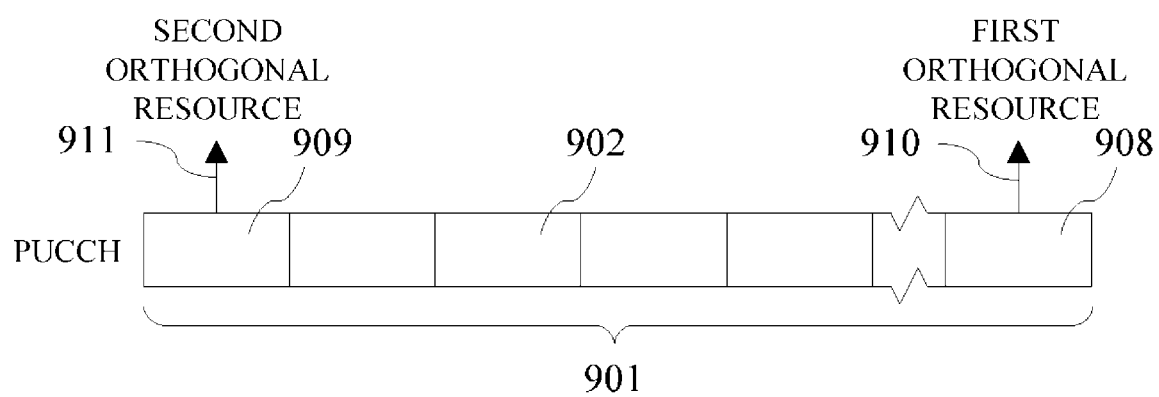
FIG. 9 illustrates another embodiment of an orthogonal resource mapping method used to perform transmit diversity in a wireless communication system with various aspects described herein.

It may also be desirable to give preference to or only use orthogonal resources that are within a given RB for PUCCH. In accordance with one aspect, the mapping of orthogonal resources for transmit diversity in a wireless communication system can be further constrained using various mapping processes such as a method 900, as illustrated in FIG. 9. In this embodiment, method 900 illustrates limiting the mapping of indices of selected CCEs to orthogonal resources within a particular RB for PUCCH that can be employed in a system using LTE or LTE-A equipment or another appropriate wireless communication technology.

Referring to FIG. 9, method 900 shows a PUCCH wrap-around method, where the PUCCH resource indexing can be wrapped around using the following:

$$m \bmod (N_r),$$

where m is the PUCCH resource index and $N_r$ is the number of orthogonal resources per PUCCH RB. For example, method 900 shows a first PUCCH orthogonal resource 908 as the last element of a PUCCH RB 901. If the next successive element of PUCCH RB 908 were selected as the second PUCCH orthogonal resource, then the second PUCCH orthogonal resource would be associated with a different PUCCH RB. Instead, the PUCCH resource index is wrapped around to the start of PUCCH RB 901, and a second PUCCH orthogonal resource 911 is selected as the first element of PUCCH RB 901.

In another embodiment, the selection of the second CCE can be constrained by and satisfy:

Starting CCE index+(offset$_i$)mod(N$_x$), where offset$_i$ is the CCE offset from the first CCE and N$_x$ is the number of CCEs whose derived PUCCH resources are in the same RB as that derived from the first CCE, which would be used to derive the ith PUCCH resource using, for instance, method 800*a*, 800*b*, 800*c* or 800*d*.

Figure 10:
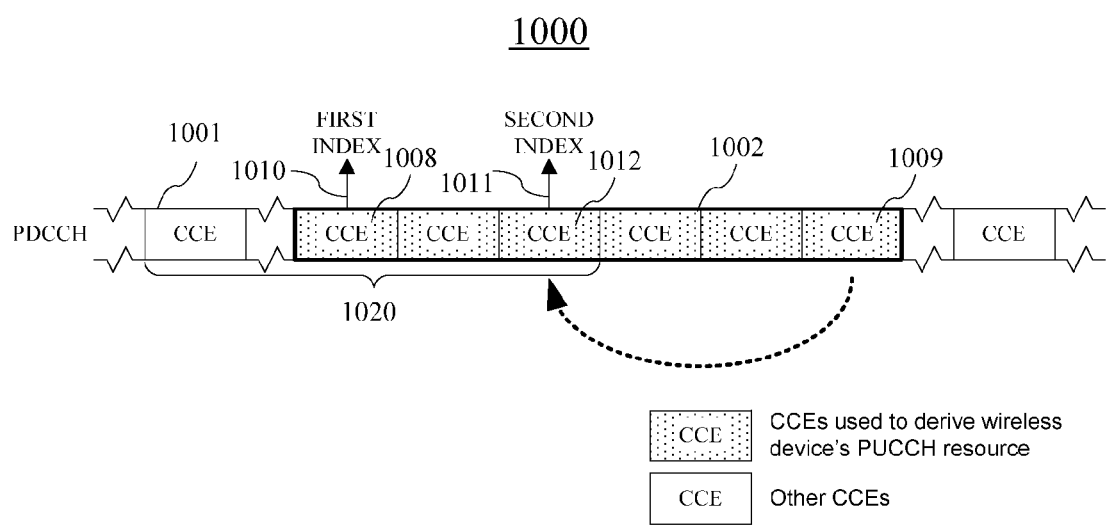
FIG. 10 illustrates another embodiment of an orthogonal resource mapping method used to perform transmit diversity in a wireless communication system with various aspects described herein.

Referring to FIG. 10, a method 1000 shows six CCEs composing a PDCCH resource 1002. In one example, the first and sixth CCEs could be used to derive two PUCCH resources using two indices. If the derived PUCCH resources from the first three CCEs of PDCCH resource 1002 correspond to a PUCCH RB 1020, while derived PUCCH resources from the last three CCEs correspond to another PUCCH RB, then a third CCE 1012 may be used to derive a second index 1011. In this way, method 1000 can allow for the use of PUCCH resources from the same PUCCH RB.

Figure 11:
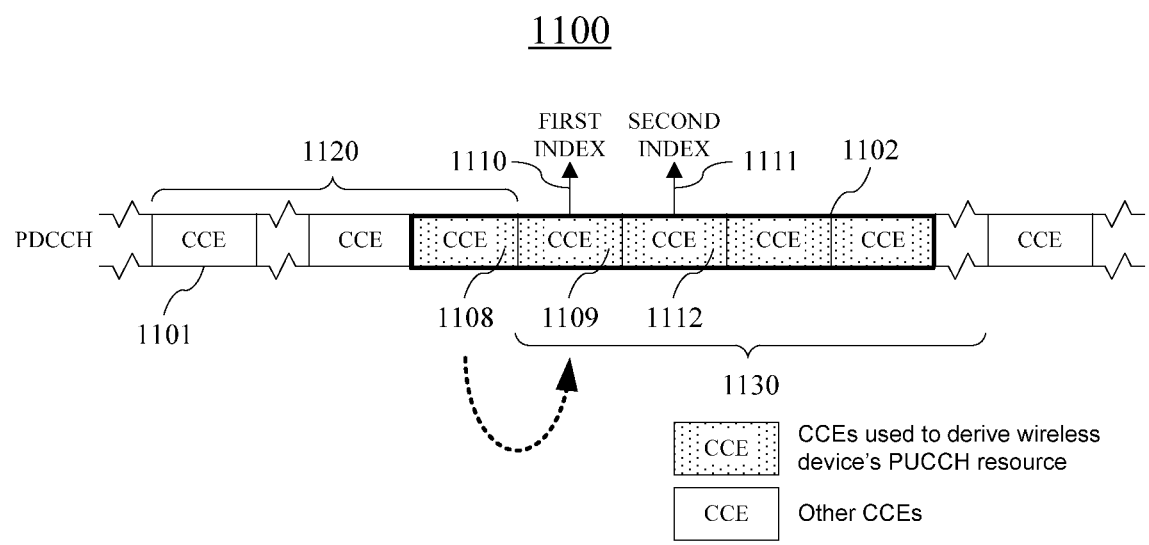
FIG. 11 illustrates another embodiment of an orthogonal resource mapping method used to perform transmit diversity in a wireless communication system with various aspects described herein.

If the wrapped around CCE is being used by a different wireless device resulting in two wireless devices transmitting on the same CCE, then a collision may occur. In such circumstance, for example, to avoid a collision, a wireless device may use the next available CCE. Such situations may occur when mapping CCEs of a PDCCH to PUCCH resources corresponding to different PUCCH RBs. In another embodiment, another alternative is to use CCEs corresponding to PUCCH resources in another PUCCH RB as described by a method 1100, as illustrated in FIG. 11. Method 1100 can allow for PUCCH resources to be derived from CCEs of a PDCCH that correspond to the same PDCCH RB.

Referring to FIG. 11, initially a first CCE 1108 can be selected in a first PUCCH RB 1120. Instead of selecting a second CCE from first PUCCH RB 1120, the first CCE can be re-selected as a first CCE 1109 and can correspond to a second PUCCH RB 1130. A second CCE 1112 can be selected and can reside within the same PUCCH RB as first CCE 1109. A first index 1110 and a second index 1111 can be derived from indices of first CCE 1109 and second CCE 1112 and can be used to select first orthogonal resource 705*a* of spreading logic 702*a* and second orthogonal resource 705*b* of spreading logic 702*b* for use in orthogonal spreading of a message, respectively.

When the number of CCEs in a PDCCH are limited to less than the number of orthogonal resources required, then an alternative method may be required. In one embodiment, a base station can assign a wireless device a PDCCH that has at least the same number of CCEs as orthogonal resources required to support transmit diversity of the wireless device.

In another embodiment, the PDCCH aggregation level can be increased by lowering the coding rate of PDCCH to increase the number of CCEs. The index of such additional CCEs can be used to derive additional orthogonal resources for a wireless device.

Figure 12:
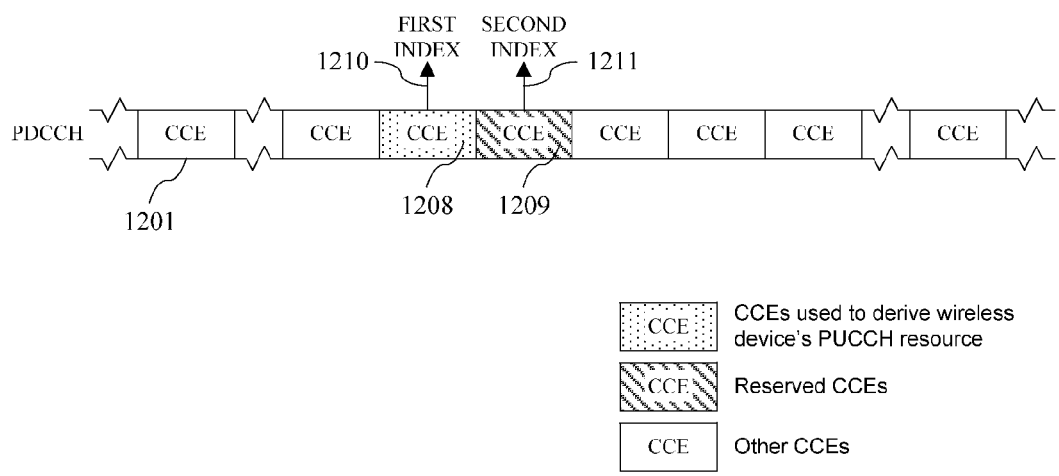
FIG. 12 illustrates one embodiment of an orthogonal resource mapping method using reserved control channel elements ("CCE") to perform transmit diversity in a wireless communication system with various aspects described herein.

In another embodiment, a base station can allocate reserved CCEs and grant access to such reserved CCEs. Referring to FIG. 12, a method 1200 shows a plurality of CCEs on a PDCCH 232. The base station can increase the PDCCH aggregation level to provide a wireless device with an additional CCE 1209 to allow the wireless device to derive an additional orthogonal resource to support, for instance, two antennas for transmit diversity. A first index 1210 and a second index 1211 can be derived from indices of a first CCE 1208 and a second CCE 1209, and used to select a first orthogonal resource 705*a* of a spreading logic 702*a* and a second orthogonal resource 705*b* of a spreading logic 702*b* for use in orthogonal spreading of a message, respectively.

In another embodiment, a wireless device may decrease the number of orthogonal resources and fallback to a lower order of transmit diversity to match the number of CCEs assigned to the wireless device by a base station. Further, antenna virtualization can be used by the wireless device to map one or more physical antennas to one or more virtual antenna. For example, a wireless device can be capable of using four physical antennas for transmit diversity. However, a base station may allocate only two CCEs in a PDCCH for the wireless device. In this scenario, the wireless device may map the four physical antennas to two virtual antennas. In such alternative, compensation of transmit power may be required due to the use of antenna virtualization. To compensate, the base station may provide the wireless device with transmit power control ("TPC") commands, which allows the wireless device to change its transmit power by specific positive or negative increments. In another method of compensation, a base station can communicate to a wireless device a predefined set of user-specific power adjustments for each configured PUCCH transmission scheme. The wireless device can perform open-loop transmit power control of PUCCH using the predefined set of user-specific power adjustments associated with the particular configured PUCCH transmission process.

In another embodiment, a base station can communicate to a wireless device the location of unassigned CCEs within the PDCCH for that subframe. For empty CCEs located elsewhere within the PDCCH, the base station may use, for example, a downlink control information ("DCI") addressed to another wireless device's common radio network temporary identifier ("C-RNTI"), or a shared DCI addressed to a common SORTD-RNTI that implicitly or explicitly provides information regarding unassigned CCEs within the PDCCH. Alternatively, an additional field within the DL grant DCI can be used by a base station and a wireless device to indicate the PUCCH resource indices.

Figure 13:
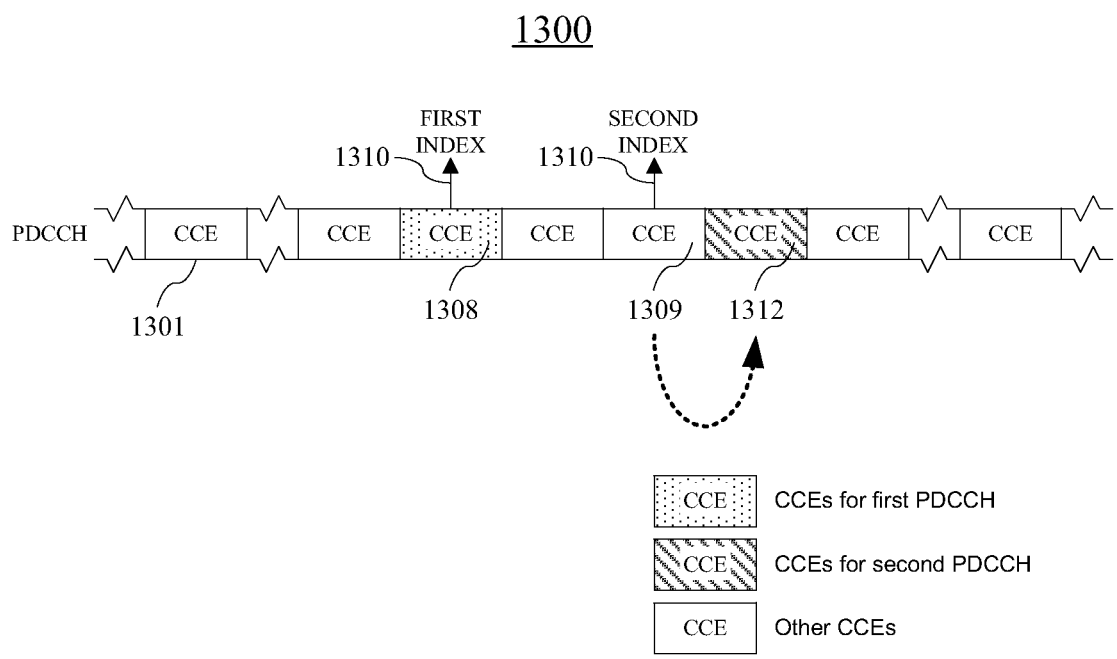
FIG. 13 illustrates another embodiment of an orthogonal resource mapping method used to perform transmit diversity in a wireless communication system with various aspects described herein.

It may be required to maintain the same mapping rule as specified in LTE Release 8, whereas the index of the first CCE in PDCCH is mapped to the first orthogonal resource of PUCCH. In one embodiment, offsets from the index of a first CCE in PDCCH can be used to derive additional orthogonal resources. Such offsets can be fixed or communicated, for instance, dynamically or statically by a base station to a wireless device. For example, the base station can communicate an offset to the wireless device using the PDCCH, if such PDCCH is transmitted with the first CCE of the PDCCH. For a situation where a collision may occur, the base station may reassign the other wireless device, with which a collision may occur, to its next possible starting CCE of the PDCCH. For example, a method 1300, as illustrated in FIG. 13, shows a plurality of CCEs on a PDCCH. A wireless device is assigned a first CCE 1308 of the PDCCH, which only contains one CCE. Another wireless device is assigned a CCE 1309. If the offset used by the wireless device corresponds to a second CCE 1309, which is being used by the other wireless device, then a potential collision may occur. To avoid such collision, the base station can move the CCE of the other wireless device from CCE 1309 to a CCE 1312. The wireless device can then use second CCE 1309.

In another embodiment, a base station can broadcast an over-provisioned PUCCH space reserved for persistent ACK/NAK and scheduling request indicator ("SRI"). For LTE Release 8, the over-provisioned PUCCH space may not be used. However, the base station and a wireless device may know the location of the PUCCH resource reserved for dynamic ACK/NAK. For LTE Release 10, a wireless device may use the over-provisioned space for persistent ACK/NAK and SRI for sending dynamic ACK/NAK on PUCCH, while applying either a two-transmit or four-transmit diversity system. The base station can provide an LTE-A-capable wireless device with the beginning boundary of the dynamic ACK/NAK PUCCH resource. In another embodiment, a similar mapping can be defined for mapping the PDCCH CCE index to the PUCCH index within this dynamic ACK/NAK PUCCH resource space.

In another embodiment, the orthogonal resources can be organized into one or more subsets of orthogonal resources. In one example, a wireless device using two antennas can access subsets of orthogonal resources comprising a first orthogonal resource for a first antenna and a second orthogonal resource for a second antenna. The same mapping rule as described by LTE Release 8 may be used to map the subsets of orthogonal resources, whereas the index may have a one-to-one mapping with the first CCE of the PDCCH. In another embodiment, the organization of the subsets of orthogonal resources may be determined using a formula that is known by both a base station and a wireless device.

It is important to recognize that the aforementioned embodiments can be applied to other communication formats such as PUCCH format 2/2a/2b and MIMO, coordinated multipoint ("CoMP"), and carrier aggregation ("CA").

In LTE Release 8, three orthogonal sequences can be used for time-direction covering, and twelve cyclic-shifted sequences can be used for frequency-direction covering. In total, a maximum of thirty-six PUCCH orthogonal resources may be supported in each PUCCH RB for formats 1a and 1b. The limited number of PUCCH orthogonal resources may limit the number of wireless devices multiplexed on one PUCCH RB. In accordance with one aspect, a transmit diversity system can use quasi-orthogonal resources to increase the number of orthogonal resources available to a system such as a system 1400 as illustrated in FIG. 14.

Figure 14:
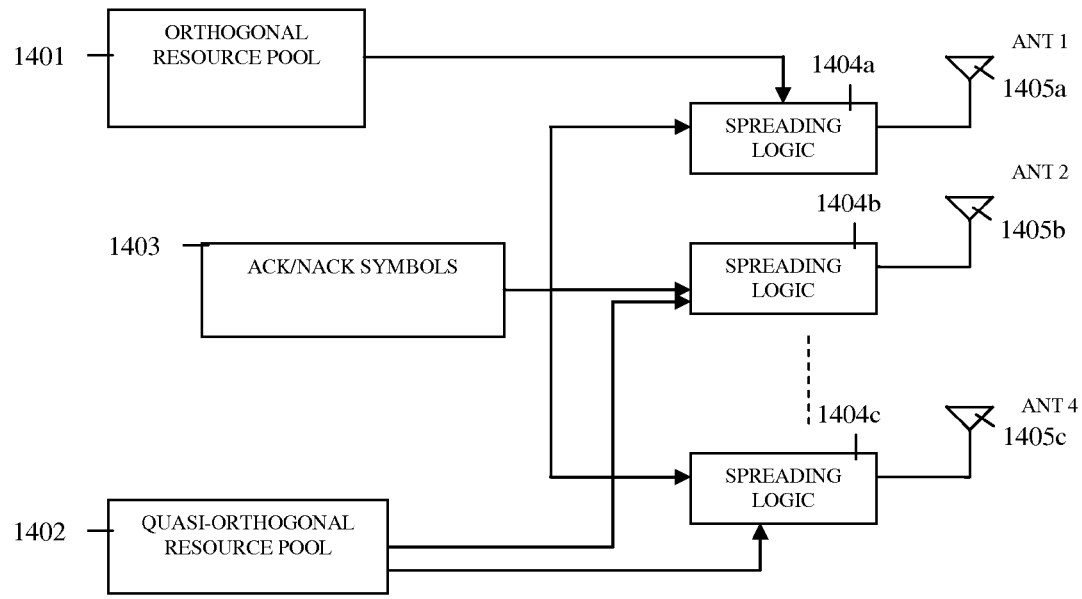
FIG. 14 illustrates another embodiment of an orthogonal and quasi-orthogonal resource mapping method used to perform transmit diversity in a wireless communication system with various aspects described herein.

In FIG. 14, a modulated message can be input to a plurality of spreading logic 1404a, 1404b and 1404c. The plurality of spreading logic 1404a, 1404b and 1404c can access an orthogonal resource pool 1401 to obtain orthogonal resources, and a quasi-orthogonal resource pool 1402 to obtain quasi-orthogonal resources. The plurality of spreading logic 1404a, 1404b and 1404c can apply to the modulated message the orthogonal resources of orthogonal resource pool 1401 and the quasi-orthogonal resources of quasi-orthogonal resource pool 1402, or a pre-calculated or concurrently-generated combination of orthogonal resources of orthogonal resource pool 1401 and quasi-orthogonal resources of quasi-orthogonal resource pool 1402. The modulated message after spreading can be transmitted from a plurality of antennas 1405a, 1405b and 1405c. The quasi-orthogonal resources of quasi-orthogonal resource pool 1402 can be generated using various approaches known to those having ordinary skill in the art.

In another embodiment, the orthogonal resources of an orthogonal resource pool 1401 may be as specified in LTE Release 8 and can be used as the orthogonal resource for transmitting PUCCH from a first antenna 1405a. The quasi-orthogonal resources of a quasi-orthogonal resource pool 1402 may then be applied to the modulated message by a second and a third spreading logic 1404b and 1404c and transmitted from antennas 1405b and 1405c, respectively.

In another embodiment, a wireless device may use the quasi-orthogonal resources only when the number of CCEs of PDCCH is less than the number of transmit antennas available to the wireless device.

In another embodiment, a wireless device may exclusively use the quasi-orthogonal resources for all of its transmit antennas.

Transmit diversity systems, such as SORTD, may not be optimal, applicable or realizable in certain situations. Therefore, there may be a need to provide a plurality of transmit diversity schemes dependent on the specific circumstances. In one embodiment, three or more transmit diversity modes can be used for a wireless device with four antennas. For example, one mode could use a SORTD system for two antennas, such as system 700. A second mode could use a SORTD system for four antennas, such as system 700. A third mode could use a single antenna transmission, such as system 600.

In another embodiment, a base station can statically or dynamically configure a wireless device for any multitude of transmit diversity modes based on, for instance, the quality of service ("QoS") of the wireless communication between the base station and the wireless device, the availability of network resources, or other conditions. QoS factors, for example, may include word error rate ("WER"), bit error rate ("BER"), block error rate ("BLER"), signal strength, signal to noise ratio ("SNR"), signal to interference and noise ratio ("SINR"), and other factors. For example, a base station can configure a wireless device to use a single antenna transmission such as system 600 when the wireless device has an adequate QoS. Alternatively, a base station can configure a wireless device to use two or more antennas in transmit diversity mode when the wireless device has a lower QoS, for instance when the wireless device is at a cell edge.

Figure 15:
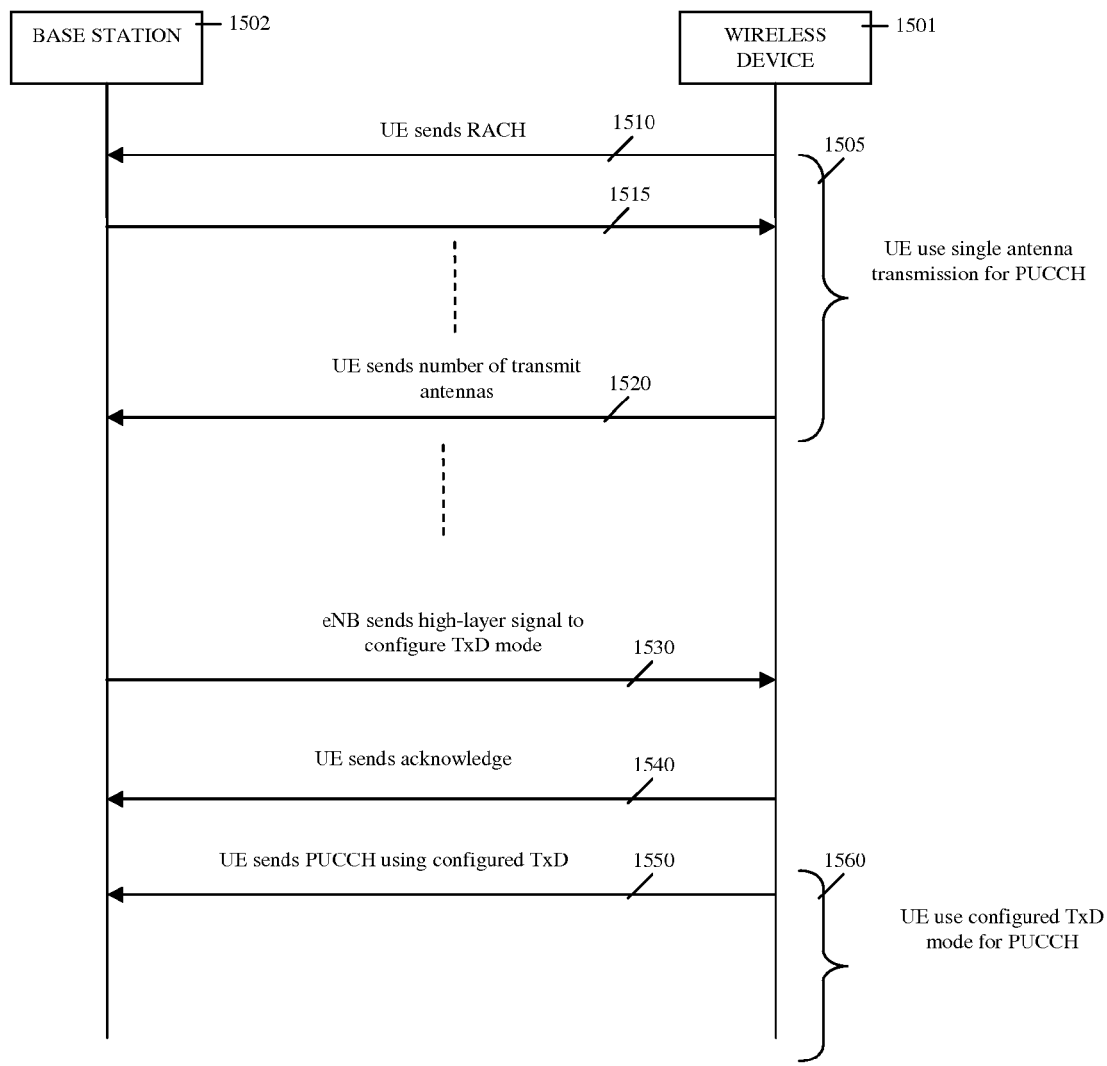
FIG. 15 illustrates one embodiment of a method for configuring wireless devices for transmit diversity in a wireless communication system with various aspects described herein.

In order for a base station to statically or dynamically configure transmit diversity modes for a wireless device may require explicit signaling between them. In accordance with one aspect, the communication of transmit diversity configuration information in a wireless communication system can use method 1500 as illustrated in FIG. 15. In one embodiment, method 1500 illustrates the communication between a base station 1502 and a wireless device 1501 in configuring transmit diversity modes for wireless device 1501.

In method 1500, wireless device 1501 initially can use a single antenna transmission for PUCCH. While in single transmission mode, wireless device 1501 can send an UL random access channel ("RACH") message to base station 1502, for instance, to request base station 1502 to configure the transmit diversity mode of wireless device 1501, as represented by 1510. Base station 1502 can confirm the RACH 1505 sent by wireless device 1501, as represented by 1515. Wireless device 1501 can send its number of transmit antennas to base station 1502, as represented by 1520. In response, base station 1502 can send a higher-layer message to configure the transmit diversity mode of wireless device 1501, as represented by 1530. Wireless device 1501 can send an acknowledgement message, as represented by 1540. Wireless device 1501 is now configured using its assigned transmit diversity mode and can send, for instance, a PUCCH message using its configured transmit diversity mode, as represented by 1550.

Method 1500 can also be applied to other channel formats such as PUSCH and PUCCH formats 2/2a/2b. It is important to note that other channel formats may require other transmit diversity modes. For example, the transmission modes for PUSCH may be a pre-coding based SM mode, a STBC-based mode, a single antenna transmission mode, or any other mode or combination of modes. Further, the transmission modes for PUCCH formats 2/2a/2b may use STBC or STBC-based mode, single antenna transmission mode, or any other mode or combination of modes.

For additional orthogonal resources for transmit diversity, such as SORTD, the assignment of orthogonal resources can be communicated using higher-layer signaling. In LTE Release 8, for PUCCH format 1 and PUCCH formats 1a/1b for semi-persistent scheduling ("SPS") transmission, the orthogonal resources may be assigned using higher-layer signaling. In one embodiment, when the DCI format indicates a semi-persistent DL scheduling activation, the TPC command for the PUCCH field can be used by higher layers to provide an index to one of four PUCCH resource indices, with the orthogonal resource mapping defined by method 1600. Further, the TPC command for PUCCH field can map to multi-dimensional orthogonal resources for the PUCCH with the orthogonal resource mapping defined by method 1700. In FIG. 16, method 1600 shows the mapping of orthogonal resources for the PUCCH when a wireless device uses one antenna. In FIG. 17, method 1700 shows the mapping of orthogonal resources for the PUCCH when a wireless device uses two antennas, for instance, in a SORTD mode.

In another embodiment, after the TPC command for the PUCCH field is used to derive the PUCCH resource for the first antenna of a wireless device, a pre-configured formula or mapping table such as fixed or configurable offsets can be used to derive PUCCH resources for the remaining antennas.

As discussed earlier, it is desirable to reduce the number of transmit collisions between wireless devices in a wireless communication system. The probability of a transmit collision will depend on the transmit diversity mode being used by a wireless device. Since a base station can control the allocation of PUCCH resources amongst the wireless devices controlled by the base station, the base station can manage the scheduling and allocation of PUCCH resources to mitigate the probability of transmit collisions. The base station can use a multitude of metrics to manage the scheduling and allocation of PUCCH resources. For example, a base station can use metrics associated with the number of PUCCH resource collisions, the number of PUCCH resource collisions for wireless devices using only one PUCCH resource, the number of PUCCH resource collisions for wireless devices using a plurality of PUCCH resources. Based on these metrics, the base station may configure its system parameters to, for instance, eliminate the probability of collision for a wireless device using one PUCCH resource, reduce the probability of collisions to no more than one collision for a wireless mobile using two PUCCH resources, reduce the probability of collisions to no more than two collisions for a wireless mobile using four PUCCH resources, other requirement, or any combination thereof.

In another embodiment, a downlink message can be, for instance, a physical downlink control channel message.

In another embodiment, a second control channel element can be, for instance, adjacent and consecutive to a first control channel element.

In another embodiment, a second control channel element can be, for instance, a fixed span from a first control channel element.

In another embodiment, a second control channel element can be, for instance, the last control channel element of a downlink message relative to a first control channel element.

In another embodiment, a second control channel element can satisfy, for instance, $$m \bmod\left(\left\lfloor \frac{M}{N} \right\rfloor\right) = 0,$$

wherein m is the index of the second control channel element, M is the number of control channel elements in a downlink message, and N is the number of orthogonal resources required.

In another embodiment, a plurality of indices can be determined using a downlink message by, for instance, using a plurality of CCEs of the downlink message, wherein each of the plurality of indices is selected using the location of adjacent and consecutive CCEs.

In another embodiment, a plurality of indices can be determined using a downlink message by, for instance, using a plurality of CCEs of the downlink message, wherein each of the plurality of indices is selected using the location of CCEs separated by a fixed span.

In another embodiment, a plurality of indices can be determined using a downlink message by, for instance, using a plurality of CCEs of the downlink message, wherein each of the plurality of indices is selected using the location of CCEs that satisfy $$m \bmod\left(\left\lfloor \frac{M}{N} \right\rfloor\right) = 0,$$

wherein m is the index of each of the plurality of CCEs, M is the number of CCEs in the downlink message, and N is the number of orthogonal resources required.

In another embodiment, a plurality of orthogonal signals can be generated by, for instance, determining a plurality of first spreading sequences using a plurality of orthogonal resources; generating a plurality of first spreading sequence signals by applying the plurality of first spreading sequences to an uplink message; determining a plurality of second spreading sequences using the plurality of orthogonal resources; and generating the plurality of orthogonal signals by applying the plurality of second spreading sequences to the plurality of first spreading sequence signals.

In another embodiment, a plurality of orthogonal signals can be generated by, for instance, determining a plurality of first spreading sequences using said plurality of orthogonal resources; determining a plurality of second spreading sequences using the plurality of orthogonal resources; generating a plurality of combined spreading sequences by applying the plurality of first spreading sequences to the plurality of second spreading sequences; and generating the plurality of orthogonal signals by applying the plurality of combined spreading sequences to the uplink message.

Having shown and described exemplary embodiments, further adaptations of the methods, devices, and systems described herein may be accomplished by appropriate modifications by one of ordinary skill in the art without departing from the scope of the present disclosure. Several of such potential modifications have been mentioned, and others will be apparent to those skilled in the art. For instance, the exemplars, embodiments, and the like discussed above are illustrative and are not necessarily required. Accordingly, the scope of the present disclosure should be considered in terms of the following claims and is understood not to be limited to the details of structure, operation, and function shown and described in the specification and drawings.

As set forth above, the described disclosure includes the aspects set forth below.

What is claimed is:

1. A method for operating a user equipment in a wireless communication system, the method comprising:
receiving a downlink message, wherein said downlink message includes a first control channel element;
determining a first index using the location of said first control channel element;
determining a second index from at least one of said first index and another downlink message;
determining a first orthogonal resource using said first index;
determining a second orthogonal resource using said second index;
spreading an uplink message using said first orthogonal resource to form a first spread signal;
spreading said uplink message using said second orthogonal resource to form a second spread signal;
transmitting said first spread signal using a first antenna; and
transmitting said second spread signal using a second antenna.

2. The method of claim 1, wherein said determining a second index uses the location of a second control channel element of said downlink message.

3. The method of claim 1, wherein said determining a second index further comprises:
obtaining said second index from said other downlink message.

4. The method of claim 1, wherein said determining a second index uses the location of said first control channel element.

5. The method of claim 1, wherein said determining a second index uses said first index.

6. A method for operating a user equipment in a wireless communication system, the method comprising:
receiving a downlink message by a wireless device from a base station;
determining a plurality of indices using said downlink message and another downlink message;
determining a plurality of orthogonal resources using said plurality of indices;
generating a plurality of orthogonal signals by applying said plurality of orthogonal resources to an uplink message; and
transmitting said plurality of orthogonal signals from said wireless device to said base station.

7. The method of claim 6, wherein said transmitting said plurality of orthogonal signals from said wireless device to said base station further comprises:
using a plurality of antennas of said wireless device to transmit said plurality of orthogonal signals.

8. The method of claim 6, wherein said determining a plurality of indices using said downlink message further comprises:
determining a first index of said plurality of indices using the location of a first control channel element of a plurality of control channel elements, wherein said downlink message includes said plurality of control channel elements; and
determining the other indices of said plurality of indices using another downlink message.

9. The method of claim 6, wherein said determining a plurality of indices using said downlink message further comprises:
determining a first index of said plurality of indices using the location of a first control channel element of a plurality of control channel elements, wherein said downlink message includes said plurality of control channel elements; and
determining the other indices of said plurality of indices using the location of said first control channel element of said plurality of control channel elements.

10. The method of claim 6, wherein said determining a plurality of indices using said downlink message further comprises:
determining a first index of said plurality of indices using the location of a first control channel element of a plurality of control channel elements, wherein said downlink message includes said plurality of control channel elements; and
determining the other indices of said plurality of indices using said first index of said plurality of indices.

11. A device in a wireless communication system, comprising:
a processor coupled to a memory containing processor-executable instructions;
a receiver and a transmitter coupled to said processor;
wherein said receiver is operable to:
receive a downlink message from a base station;
wherein said processor is operable to:
derive a first index using the location of a first control channel element of said downlink message;
derive a second index from at least one of said first index and another downlink message;
determine a first orthogonal resource using said first index;
determine a second orthogonal resource using said second index;
generate a first orthogonal signal by applying said first orthogonal resource to an uplink message;
generate a second orthogonal signal by applying said second orthogonal resource to said uplink message; and
wherein said transmitter is operable to:
transmit said first and said second orthogonal signals to said base station.

12. The device of claim 11, wherein said processor is further operable to derive said second index using the location of a second control channel element of said downlink message.

13. The device of claim 11, wherein said processor is further operable to derive said second index by obtaining said second index using said other downlink message.

14. The device of claim 11, wherein said processor is further operable to derive said second index using the location of said first control channel element.

15. The device of claim 11, wherein said processor is further operable to derive said second index using said first index.

16. The device of claim 11, wherein said transmitter is further operable to:
transmit said first orthogonal signal using a first antenna; and
transmit said second orthogonal signal using a second antenna.

17. A system of wireless communication, comprising:
a base station;
a wireless device communicatively linked to said base station, wherein said wireless device receives a downlink message from said base station;

derives a first index using a first control channel element of said downlink message;

derives a second index from at least one of said first index and another downlink message;

determines a first orthogonal resource using said first index;

determines a second orthogonal resource using said second index;

generates a first orthogonal signal by applying said first orthogonal resource to an uplink message;

generates a second orthogonal signal by applying said second orthogonal resource to said uplink message;

transmits said first orthogonal signal from a first antenna to said base station; and transmits said second orthogonal signal from a second antenna to said base station.

18. The system of claim 17, wherein the number of control channel elements of said downlink message is greater than or equal to the number of orthogonal resources assigned to said wireless device.

19. The system of claim 17, wherein said base station changes the number of control channel elements of said downlink message to match the number of orthogonal resources assigned to said wireless device.

20. The system of claim 17, wherein said base station allocates a reserved control channel element of said downlink message to match the number of orthogonal resources assigned to said wireless device.

21. The system of claim 17, wherein said wireless device derives said second index using a second control channel element of said downlink message.

22. The system of claim 17, wherein said wireless device derives said second index using said other downlink message.

23. The system of claim 17, wherein said wireless device changes the number of orthogonal resources to match the number of control channel elements of said downlink message assigned by said base station.

24. The system of claim 17, wherein said wireless device changes the transmit diversity mode of said wireless device to match the number of control channel elements of said downlink message assigned by said base station.

25. The system of claim 17, wherein said base station assigns to said wireless device an offset from said first control channel element to a second control channel element both of said downlink message, wherein said downlink message is a physical downlink control channel message, and the selection of said second control channel element is limited to those control channel elements of said downlink message corresponding to a physical uplink control channel resource transmitted in the same physical uplink control channel resource block.

26. The system of claim 17, wherein said wireless device derives said second index using said first index.

* * * * *

UNITED STATES PATENT AND TRADEMARK OFFICE
CERTIFICATE OF CORRECTION

PATENT NO. : 8,699,543 B2  
APPLICATION NO. : 12/860624  
DATED : April 15, 2014  
INVENTOR(S) : Hua Xu et al.

Page 1 of 1

It is certified that error appears in the above-identified patent and that said Letters Patent is hereby corrected as shown below:

In the Claims

In Column 19, line 5, Claim 17, delete "using" and insert -- based on --, therefore.

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,699,543 B2  
APPLICATION NO. : 12/860624  
DATED : April 15, 2014  
INVENTOR(S) : Hua Xu et al.

Page 1 of 2

It is certified that error appears in the above-identified patent and that said Letters Patent is hereby corrected as shown below:

In the Claims

Column 17, Line 10, Claim 1, Delete "receiving a downlink message" and insert -- detecting a downlink control channel --, therefor.

Column 17, Line 11, Claim 1, Delete "message" and insert -- control channel --, therefor.

Column 17, Lines 14-15, Claim 1, Delete "from at least one of said first index and another downlink message" and insert -- based on said first index --, therefor.

Column 17, Line 16, Claim 1, After "determining" insert -- a first indicator of --, therefor.

Column 17, Line 20, Claim 1, Delete "using" and insert -- based on --, therefor.

Column 17, Line 30, Claim 2, Delete "message" and insert -- control channel --, therefor.

Column 17, Line 33, Claim 3, Delete "said other" and insert -- another --, therefor.

Column 17, Line 42, Claim 6, Delete "receiving a downlink message" and insert -- detecting a downlink control channel --, therefor.

Column 17, Lines 44-45, Claim 6, Delete "message and another downlink message" and insert -- control channel --, therefor.

Column 17, Line 46, Claim 6, After "determining" insert -- a plurality of indicators of --, therefor.

Column 17, Line 59, Claim 8, Delete "message" and insert -- control channel --, therefor.

Column 17, Line 64, Claim 8, Delete "message" and insert -- control channel --, therefor.

Column 18, Line 2, Claim 9, Delete "message" and insert -- control channel --, therefor.

Column 18, Line 7, Claim 9, Delete "message" and insert -- control channel --, therefor.

Column 18, Line 13, Claim 10, Delete "message" and insert -- control channel --, therefor.

Column 18, Line 18, Claim 10, Delete "message" and insert -- control channel --, therefor.

Column 18, Line 28, Claim 11, Delete "receive a downlink message" and insert -- detect a downlink control channel --, therefor.

Signed and Sealed this  
Ninth Day of September, 2014

Michelle K. Lee  
*Deputy Director of the United States Patent and Trademark Office*

CERTIFICATE OF CORRECTION (continued)

Column 18, Line 31, Claim 11, Delete "message" and insert -- control channel --, therefor.

Column 18, Lines 32-33, Claim 11, Delete "from at least one of said first index and another downlink message" and insert -- based on said first index --, therefor.

Column 18, Line 34, Claim 11, After "determine" insert -- a first indicator of --, therefor.

Column 18, Line 35, Claim 11, After "determine" insert -- a second indicator of --, therefor.

Column 18, Lines 46-47, Claim 12, Delete "message" and insert -- control channel --, therefor.

Column 18, Line 50, Claim 13, Delete "said other" and insert -- another --, therefor.

Column 18, Lines 66-67, Claim 17, Delete "receives a downlink message" and insert -- a downlink control channel --, therefor.

Column 19, Line 4, Claim 17, Delete "and another downlink message", therefor.

Column 19, Line 5, Claim 17, After "determines" insert -- a first indicator of --, therefor.

Column 19, Line 7, Claim 17, After "determines" insert -- a second indicator of --, therefor.

Column 19, Line 17, Claim 18, Delete "message" and insert -- control channel --, therefor.

Column 19, Line 22, Claim 19, Delete "message" and insert -- control channel --, therefor.

Column 19, Line 26, Claim 20, Delete "message" and insert -- control channel --, therefor.

Column 20, Line 3, Claim 21, Delete "message" and insert -- control channel --, therefor.

Column 20, Line 5, Claim 22, Delete "said other" and insert -- another --, therefor.

Column 20, Lines 8-9, Claim 23, Delete "message" and insert -- control channel --, therefor.

Column 20, Line 13, Claim 24, Delete "message" and insert -- control channel --, therefor.

Column 20, Lines 18-19, Claim 25, Delete "message, wherein said downlink message is a physical downlink control channel message" and insert -- control channel, wherein said downlink control channel is a physical downlink control channel --, therefor.